TRAVELLING-WAVE TUBE OSCILLATOR

Filed June 26, 1961

3 Sheets-Sheet 1

INVENTORS.
HIROSHI TACHIZAWA
AKIRA SATO
BY Arthur M. Silberman
Agent

TRAVELLING-WAVE TUBE OSCILLATOR

Filed June 26, 1961 3 Sheets-Sheet 2

INVENTORS.
HIROSHI TACHIZAWA
AKIRA SATO
BY Arthur M. Lieberman
Agent

Sept. 17, 1963 HIROSHI TACHIZAWA ETAL 3,104,359

TRAVELLING-WAVE TUBE OSCILLATOR

Filed June 26, 1961 3 Sheets-Sheet 3

INVENTORS.
HIROSHI TACHIZAWA
BY AKIRA SATO

Arthur M. Lieberman

Agent

United States Patent Office 3,104,359
Patented Sept. 17, 1963

3,104,359
TRAVELLING-WAVE TUBE OSCILLATOR
Hiroshi Tachizawa and Akira Sato, Tokyo, Japan, assignors to Nippon Electric Company, Limited, Tokyo, Japan, a corporation of Japan
Filed June 26, 1961, Ser. No. 119,696
Claims priority, application Japan Dec. 29, 1960
2 Claims. (Cl. 331—82)

The present invention relates to an external feedback type oscillator employing a traveling-wave tube.

Heretofore, in the conventional external feedback type of traveling-wave tube oscillators, the oscillation is unstable, or output power of the oscillation varies with the fluctuation of voltage of power source and with the reduction of gain of the traveling-wave tubes, as will later be described referring to the drawings.

Therefore, an object of this invention is to provide a traveling-wave tube oscillator that is stable against the fluctuation of voltage of power source.

Another object of the invention is to provide a traveling-wave tube oscillator that is stable against the decrease of collector current of the traveling-wave tube caused by the deterioration of the characteristics of the tube.

Still another object of the invention is to provide a traveling-wave tube oscillator of which operating point can be selected over a broad range, and the cost of which can be lessened because power sources therefor are not necessarily stabilized as before.

Now the invention will be described with reference to the accompanying drawings, in which:

FIGS. 1(*a*), (*b*), (*c*), and (*d*) shows the operating characteristics of traveling-wave tubes for explaining the principles of operation of the oscillator according to the invention;

Figures 1A, 1B, 1C, 1D:
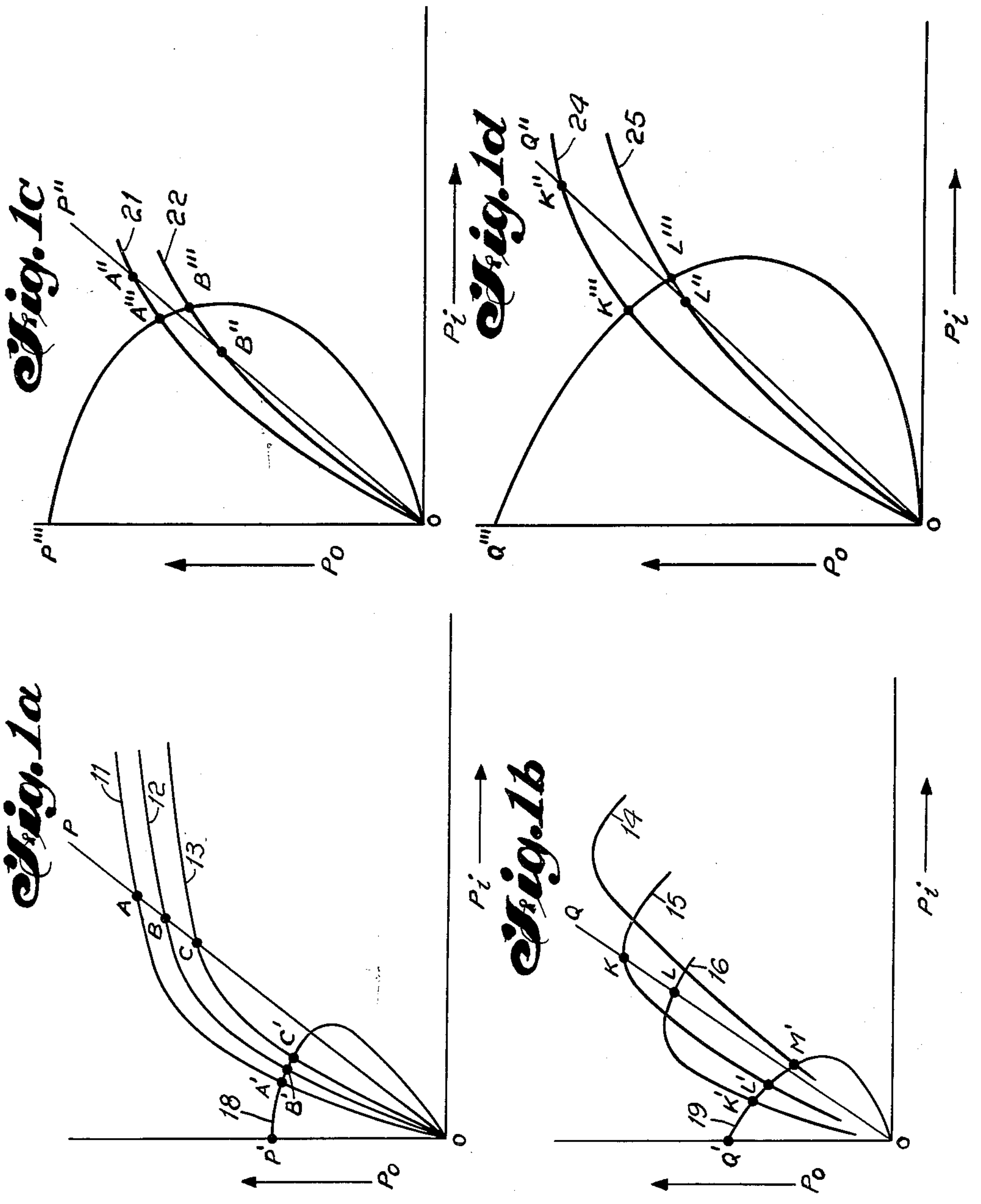

The principle of the invention, in the first place, will be disclosed referring to FIGS. 1(*a*), (*b*), (*c*), and (*d*).

In general, curves of output power versus input power of the traveling-wave tube are shown by curves 11, 12, and 13 in FIG. 1 in which the ordinate represents input power P*i*, the abscissa, output power P*o*, maintaining the helix voltage V*h* constant, and taking the collector current I*c* as a parameter. On the other hand, the output power versus the input power characteristics are shown by curves 14, 15 and 16 in FIG. 2, in which the collector current I*c* is maintained constant and the voltage of the helix is taken as a parameter. As seen obviously from the properties of the traveling-wave tube, the characteristic curve moves from 11 to 12 and further to 13 with the decrease of collector current, which is taken as a parameter, in FIG. 1(*a*). In FIG. 1(*b*) the characteristic curve moves from the curves 14 to 15 and further to 16 with decrease of the voltage of helix taken as a parameter. In the next place, we shall consider the case where the traveling-wave tube having such characteristics as illustrated above is equipped with an external feedback circuit to form an oscillator. When the characteristic of the feedback circuit is represented in the diagram of output power versus input power of the traveling-wave tube, the input power of feedback circuit is represented by the output power P*o* of the traveling-wave tube, and the output power of feedback circuit, by the input power P*i* of the traveling-wave tube as with the general cases, considering the increase and decrease of output power from this oscillator as those of output power of the feedback circuit, namely, those of input power P*i* of the traveling-wave tube, the characteristic of the ordinary feedback circuit can be represented by a straight line OP in FIG. 1(*a*) or a straight line OQ in FIG. 2(*b*), in the condition that output power of the oscillation of a certain level is derived. Depending on the operating voltage for the traveling-wave tube, the traveling-wave tube oscillator is stabilized at point A, B, or C in FIG. 1(*a*) which is one of the intersecting points of the characteristic curve 11, 12, or 13 of the traveling-wave tube with the straight line OP showing the characteristic of the feedback circuit, and at point K or L in FIG. 1(*b*) which is one of the intersecting points of the characteristic curve 15 or 16 of the traveling-wave tube with the straight line OP representing the characteristic of the feedback circuit. If a nonlinear circuit which has a characteristic curve such as a curve OP′ in FIG. 1(*a*) or a curve OQ′ in FIG. 1(*b*), namely, which is shown by a curve passing the original point O and having curve portions 18 and 19 of negative gradient between the increase of the input power P*i* and the output power P*o*, is employed as the feedback circuit in place of a linear circuit which has a straight line characteristic oscillation of the traveling-wave tube oscillator is stabilized at the intersecting point A′, B′, or C′ of the curves 11, 12, or 13 with the curve OP′ in FIG. 1(*a*) and at the intersecting point K′, L′, or M′ of the curve 14, 15, or 16 with the curve OQ′ in FIG. 1(*b*).

As shown in FIG. 1(*a*), the input power versus output power characteristics of a traveling-wave tube shows a saturation characteristic, in which the output power is saturated with increase of input power. It is often necessary to operate the traveling-wave tube at a certain output power level lower than the saturation power level, in a traveling-wave tube oscillator. Hence, we shall consider the case where a traveling-wave tube which has an output power level high enough in such a range that the output power P*o* scarcely increases even if the input power P*i* increases, and which has a gain high enough is operated a certain output level smaller than the saturation power level, with reference to the drawings FIGS. 1(*c*) and 1(*d*), each of which corresponds to FIGS. 1(*a*) and 1(*b*), respectively. In 1(*c*), curves 21 and 22, a straight line OP″, a curve OP‴, and points A″, B″, and A‴, and B‴ are shown in FIG. 1(*c*), each of which corresponds, respectively, to curves 11 and 12, a straight line OP, a curve OP, and points A, B, A′, and B′ shown in FIG. 1(*a*). When the collector current I*c* of the traveling-wave tube is varied or varies from a value on the curve 21 to a value on the curve 22, stable point of oscillation changes from A″ and B″ with the linear circuit, and from A‴ to B‴ with the nonlinear circuit as mentioned above. In FIG. 1(*d*), curves 24 and 25, a straight line OQ″, a curve OQ‴, and points K″, L″, K‴, and L‴ are shown, corresponding, respectively, to curves 14 and 15, a straight line OQ, a curve OQ, and points K, L, K′, and L′ in FIG. 1(*b*). In this diagram also, the stable point of oscillation changes from a point K″ to a point L″, with a linear feedback circuit or from a point K‴ to a point L‴ with above-mentioned nonlinear circuit, with a variation of helix voltage V*h* of the traveling-wave tube from a value on the curve 24 to one on the curve 25. In both of FIGS. 1(*c*) and 1(*d*), the gradients of the characteristic curves of the traveling-wave tube and of the characteristic straight line of the feedback circuit, which show the characteristics of the feedback circuit, are positive, therefore, the stable points of oscillation, which are shown by the intersecting points between these curves and straight lines, are moved more widely than the case where a nonlinear circuit is employed as its feedback circuit. As will be understood from the above, the output power of the conventional traveling-wave tube oscillator which employs a linear feedback circuit is caused to enormously vary with fluctuation of collector current Ic or helix voltage V$h$, with a result that the output of the traveling-wave tube oscillator is caused to be stopped.

The present invention has such an object as to provide a traveling-wave tube oscillator which can be stabilized over a wide region of the collector current Ic and the helix voltage V$h$, providing a microwave oscillator stabilized against the change thereof, by use of a nonlinear feedback circuit having characteristics as shown by curves OP''' in FIG. 1($c$) and OQ''' in FIG. 1($d$) as its feedback circuit. Moreover, as will be seen from the above, the variation of a crystal diode is utilized as a nonlinear circuit element in order to realize such a nonlinear circuit of the present invention. The construction and operation of the invention will be described with reference to FIGS. 2 and 3, both of which illustrates mainly in block diagrams an embodiment of this invention.

Figures 2, 3:
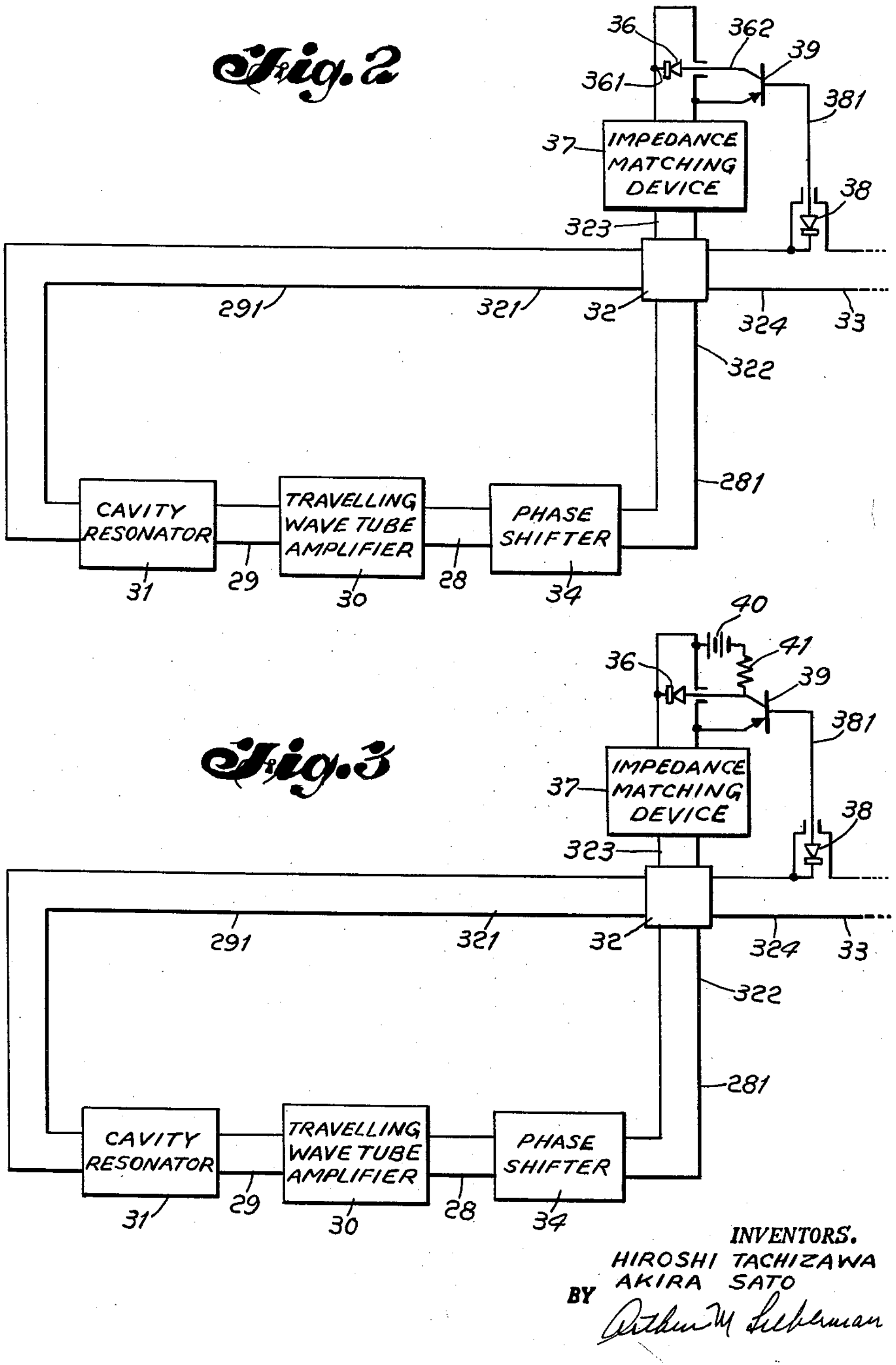
FIGS. 2 and 3 illustrate two embodiments of the invention, mainly in blocks.

As shown in FIGS. 2 and 3, the traveling-wave tube oscillator of the invention comprises a traveling-wave tube amplifier 30 composed of a traveling-wave tube having an input waveguide 28 and an output waveguide 29. A cavity resonator 31 installed on the output waveguide 29 is a resonator for determining the frequency of the oscillation. The cavity resonator 31 is connected to an arm 321 of a directional coupler 32 by means of a waveguide 291 so as to derive output power of oscillation therefrom and to perform such nonlinear feedback mentioned above. The directional coupler 32 has at least three arms, in which magnetic wave passing through an arm is divided into predetermined arms, as is the case with a magic T coupler. It is supposed here that an electromagnetic wave from the arm 321 is transmitted not to the arm 322, but to the arms 323 and 324 in a dividing manner and that, similarly, another electromagnetic wave from the arm 323 is transmitted at least to the arm 322. A waveguide 281, which constitutes a part of the feedback circuit, is connected to the arm 322, and an output waveguide 33 of the oscillator, to the arm 324. The waveguide 281 connected to the arm 322 is coupled to the input waveguide 28 of the traveling-wave tube by means of a phase shifter 34. One end of the waveguide constituting the arm 323 is preferably closed by a plate of conducting material. A crystal diode 36 is mounted at a position such that is inwardly distant from the plate a little shorter than a quarter of the guide wavelength λ. One end of the diode is electrically and mechanically connected to the internal wall of the arm 323 by means of a lead 361 and by way of deriving a wire 362 connected to the other end of the diode through a small hole formed on the wall of the arm 323 and then fixing the wire at the hole by means of an insulator for high frequency use. It does not matter whether the external end of the arm 323 is held open, when the wave is allowed to be sent out in the neighborhood thereof and also whether the end is partially closed by means of conductor plate or a plate made of other materials instead of conducting materials. It is not always a necessary condition that the distance between the end and the crystal diode is shorter than the quarter of the guide wavelength λ/4 mentioned above. It is the most effective, as will clearly be seen from the later description that the leads 361 and 362 connected to the diode 36 are held in substantially parallel with the direction of the electric field in the arm 323, but this is not the necessary condition for the diode. In addition, it does not matter, whether the lead 362 connected to and pulled out from the diode is fixed in any other way instead of being fixed at the hole by means of an insulator as mentioned above. It may be more convenient that the portion of the waveguide, namely, the arm 323 of the directional coupler is equipped with an impedance matching device, which may be, for example, a screw of conducting material capable of easy penetration into the arm 323, in the wall of the waveguide portion and at a position more inwardly than the diode 36. On the other hand, a detector 38 is equipped between the output waveguide 33 of the oscillator or the cavity resonator 31 and the directional coupler 32, so as to detect and derive the microwave passing therethrough. And the lead 381 connected to the other end of this detector 38 is connected to the base of a transistor 39. The emitter electrode of this transisitor 39 is connected to the outside surface of the arm 323 of the directional coupler. When the leads 361 and 362 of the diode 36 are not held in substantially parallel with the direction of electric field of the microwave in the arm 323, the point where the emitter of the transistor 39 is connected to the outside wall of the arm 323 are preferably nearer in the axial direction to the point where the lead 361 is connected to the inside wall of the arm 323. The collector of the transistor 39 is connected to the lead 362 of the diode 39. In the embodiments shown in FIGS. 2 and 3, the transistor 39 is of a P-N-P transistor. In case the transistor 39 is of N-P-N type, not the anodes of the diodes 36 and 38, that of the detector 38 but the cathodes thereof are connected respectively to the arm 323 of the directional coupler and to the inside wall of the output waveguide 33 of the oscillator.

In the embodiment illustrated in FIG. 3, in addition to the construction described in the above, a battery 40 and a resistor 41, connected to each other in series so that they supply variable inverse bias-voltage to the diode 36, are connected between the outside wall of the arm 323 of the directional coupler and the collector of the transistor 39. In case the transistor 39 is of N-P-N type, the cathode of the battery 40 is installed near to the outside wall of the arm 323 of the directional coupler, and the anode, near the collector of the transistor 39. In this case a high-power germanium diode may be suitable for the diode 36.

In the traveling-wave tube oscillator of this invention, an electromagnetic wave of a predetermined frequency, for example, a microwave of 4,000 mc. flowing out from the cavity resonator 31 travels to the arms 323 and 324 at the directional coupler. The wave is reflected in the arm 323 in a desirable condition, and the reflected wave travels to the arm 322 at the directional coupler 32. Depending on the characteristics of the directional coupler 32, a portion of the reflected wave travels to the arm 321, but, this portion hardly disturbs the operation of the traveling-wave tube oscillator of the present invention. The reflected wave returns to the traveling-wave tube amplifier 30 through the phase shifter 34. Therefore, the output waveguide 29, the cavity resonator 31, the waveguide 291 connecting the resonator to the directional coupler 32, the arm 323 of the directional coupler, the waveguide 281 extending from the arm to the phase shifter 34 and the input waveguide 28 constitute an external feedback circuit of this traveling-wave tube oscillator.

With the increase of energy of the microwave passing through the output waveguide 29, the feedback quantity along this feedback circuit increases in almost linear proportion to the input power, namely, in linearly proportion to the output power of the traveling-wave tube, because the energy of the electromagnetic wave reflected at the arm 323 increases up to a certain magnitude.

With the increase of energy of the electromagnetic wave passing through the output waveguide 29, detected output at the detector 38, or detected current, namely the current flowing from the emitter of the transistor 39 to the base thereof, becomes large, because the electromagnetic wave travels also through the output waveguide 33 at the directional coupler 32. Then the impedance between the emitter of the transistor 39 and the collector thereof decreases. On the other hand, a voltage is applied between the both poles of the diode 36 in response to the field intensity of microwave flowing at the adjacent of the diode 36, and rectified current is able to be caused to flow. Such rectified current increases in response to the intensity of the microwave travelling through the arm 323 of the directional coupler, although the current may depend on the voltage versus current characteristic of the diode 36. In the construction of the embodiment of this invention the rectified current flows through the emitter and collector of the transistor 39. Consequently, when the energy of the microwave from the output waveguide 29 comes up to a certain magnitude with a result that the detected current also increases, the rectified current from the diode 36 begins to flow and increases with the increase of the energy. In the embodiment shown in FIG. 3 the current, which returns from the anode of the battery 40 to the cathode thereof through the emitter and collector of the transistor 39 and resistor 41, is caused to flow, eventually, voltage drop is caused in such a sense that decreases the inverse biassing voltage applied to the diode 36 is produced at the resistor 41. The voltage drop controls the rectified current flowing in the diode 36. In this invention, therefore, the impedance of the diode 36 depends on the voltage versus current characteristic of the diode, the rectified current, and that of the inverse bias-voltage. As the impedance of the diode 36 approaches to the characteristic impedance seen at the branching point of the directional coupler 32 toward the arm 323, the energy of the electromagnetic wave absorbed at the diode 36 increases, with a result that the energy of the electromagnetic wave which is reflected by the arm 323 and which travels to the arm 322, namely to the input of the traveling-wave tube amplifier 30 decreases. In other words, when the energy of the electromagnetic wave from the output waveguide 29 becomes larger than a certain magnitude, the feedback quantity through this external feedback circuit decreases with the increase of the input power of the circuit, namely, the output power of the traveling-wave tube.

In this way, this external feedback circuit becomes a nonlinear feedback circuit as mentioned above. On the other hand, the voltage versus current characteristics of crystal diode are not usually uniform in general, causing the relation between the output power of the traveling-wave amplifier 30 and the feedback circuit not to be uniform, however, it is possible to realize the nonlinear characteristic of the external feedback circuit independently of the fluctuation of the characteristics of the diode 36 by way of varying the characteristic impedance of the arm 323 of the directional coupler by means of the matching device 34. Since the phase shifter 34 is a device for adjusting the phase shift of the signal in the external feedback circuit to make satisfy the oscillating phase difference condition between the signals in the input and the output ends of the traveling-wave amplifier 30, this phase shifter may be inserted at the output waveguide 29 not at the input waveguide 28. Moreover, this phase shifter may be removed in case the phase shift of the signal along the external feedback circuit is held in such a range that the phase condition for oscillation is satisfied.

Figure 4:
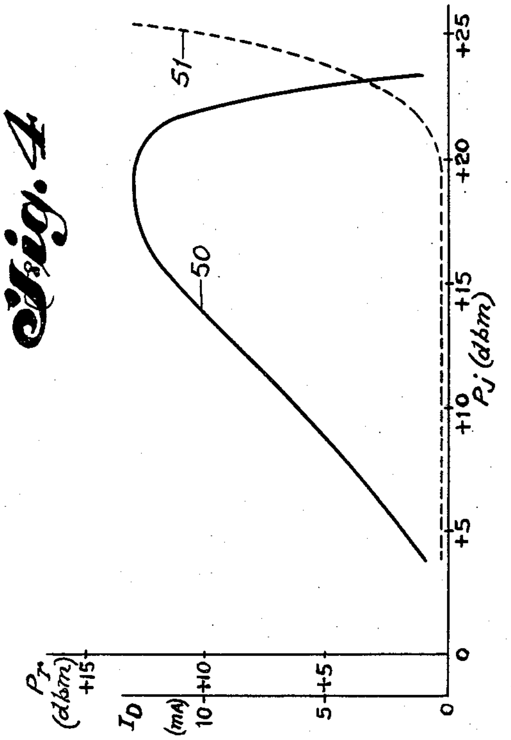

FIG. 4 shows an operating characteristic of the embodiment illustrated in FIG. 2 by a solid curve 50 in the case that it is operated with a traveling-wave tube of saturated output power of 6 w. and at an oscillating frequency of 4,000 mc. The abscissa of this drawing represents the power traveling to the arm 323 of the directional coupler, namely, the input power P*i* incident upon the diode 36 in dbm, that is, a decibel unit letting 1 mw. be 0 db, whereas, the ordinate, the feedback power, namely, the power P*r* reflected from the arm 323 and traveling to the arm 322, by the same unit dbm.

Figure 5:
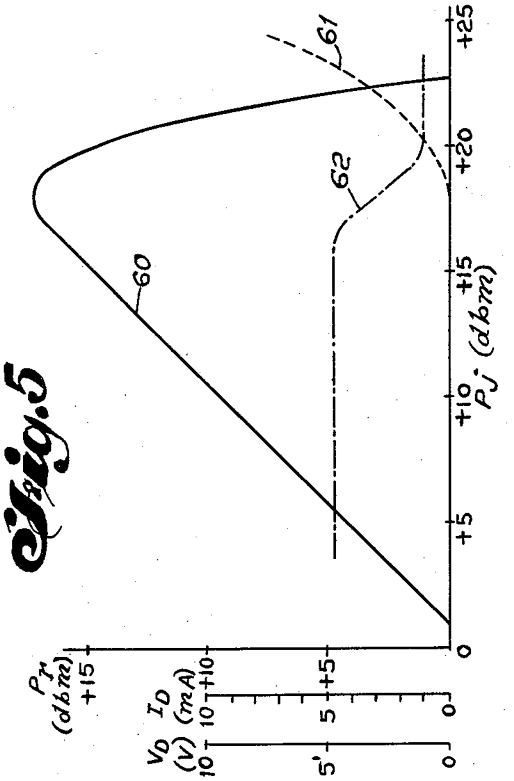
FIGS. 4 and 5 show the operating characteristics of the embodiments shown in FIGS. 2 and 3.

FIG. 5 represents the operating characteristics of the embodiment shown in FIG. 3 by a solid curve 60 and a broken curve 61 as in FIG. 4. In addition thereto, the inverse bias voltage $V_D$ of the diode 36 is taken at the ordinate in volt, for showing the characteristic by a chained curve 62. As will be understood from FIG. 5 the reflected power P*r* is about 3 db larger than that of the embodiment shown in FIG. 2.

Figure 6:
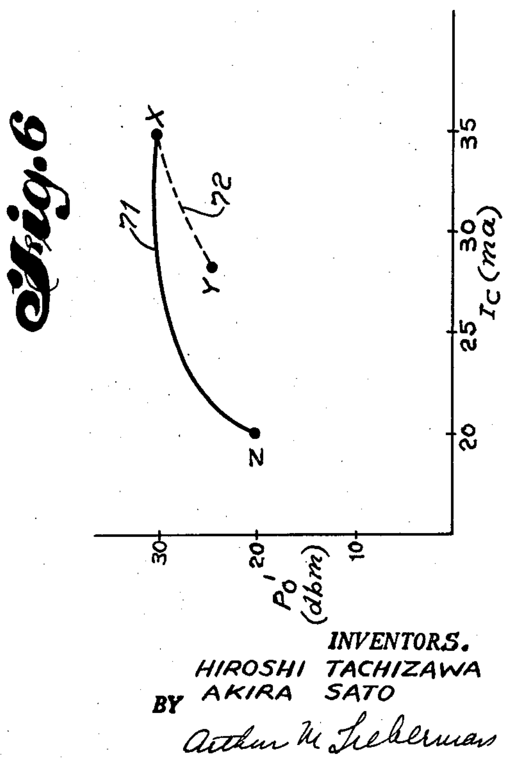

FIG. 6 represents the operating characteristics of the traveling-wave tube oscillator, taking the collector current I*c* of the traveling-wave tube at the abscissa in ma., and output power of oscillation P*o'*, at the ordinate in dbm as in FIGS. 4 and 5, wherein, a solid curve 71 shows the case employing the feedback circuit of the present invention, and a broken curve 72, the characteristic, the case employing a linear feedback circuit. With decreasing the collector current I*c* from the condition shown by a point X where the collector current is about 35 ma. and the output power of oscillation about 30 dbm is derived, the output power P*o'* decreases with the conventional traveling-wave tube oscillators, and is eventually caused to decrease discontinuously, when the collector current I*c* is below 30 ma. the output power of oscillator, with a consequent result that the oscillation itself is caused to stop as shown by point Y. Whereas in the embodiments of this invention, the outpower power of oscillator P*o'* hardly changes even if the collector current I*c* may decrease by about 10 ma. It is with the current around 20 ma., when the power decreases discontinuously, and eventually the oscillation is caused to stop as shown by a point Z. It will be understood from the above that the oscillating range of the embodiment of the present invention is wider about three times than that of the conventional oscillator. In accordance with this invention, the collector current I*c* of the traveling-wave tube is adjustable over the wider range, moreover, the oscillation is not only stable, but also the output power of oscillator is held almost constant, against wide fluctuation of the collector current I*c*.

Figure 7:
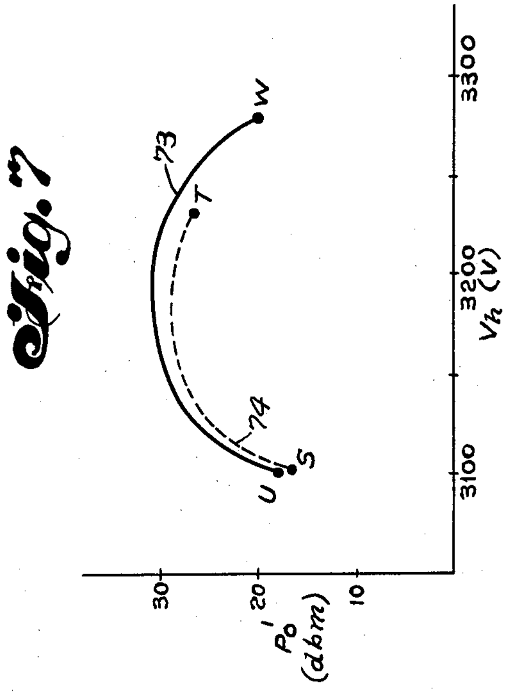
FIGS. 6 and 7 show the operating characteristics of the traveling-wave tube oscillator for explaining the operation and technical merits of the traveling-wave tube oscillator of this invention.

FIG. 7 illustrates the characteristics similar to that shown in FIG. 6, taking helix voltage Vh of the traveling-wave tube in the abscissa. In the drawing, the solid curve 73 represents the characteristic of the embodiment of this invention, and the broken curve 74, the characteristic in the case that a linear circuit is used as feedback circuit. In this embodiment of the invention the output power P*o'* of oscillator is obtained over the range extending from 3.10 kv. to 3.28 kv. of the helix voltage V*h*, almost symmetrically with respect to the center voltage between the above two voltages. In the conditions shown by points U and V corresponding to the voltages at both ends of the range, the output power P*o'* of the oscillator decreases discontinuously, and eventually the oscillation is ceased to stop. In the conventional traveling-wave tube oscillators, the output power P*o'* of the oscillator is obtained only in the range extending from about 3.10 kv. to about 3.22 kv., wherein the oscillation ceases at the points S and T corresponding to the voltages at both ends, and wherein each of the output power P*o'* of the oscillator at the both points is not equal to the other. As mentioned in the above the oscillating range of the embodiment of this invention is about 60 v. wider than that of the conventional ones.

In the embodiments described above, the transistor 39 and the battery 40 are employed so as to control the impedance of the diode 36 by way of the detected current obtained by detecting a portion of the output power of the traveling-wave amplifier 30 by means of the detector 38. However, the control circuit including the transistor 39 may be replaced with that including vacuum tubes or other control elements. Moreover, in the embodiments mentioned above, the output waveguide 33 of the oscillator is connected to the arm 324 of the directional coupler. When the output power of oscillator is obtained in this way, the constitution of the traveling-wave tube oscillator can be made simple. Alternatively, the output waveguide of the oscillator may be connected to the waveguide 291 between the cavity resonator 31 and the directional coupler 32. Moreover, the cavity resonator 31 may be inserted into the input waveguide 28 instead of the output waveguide 29. Alternatively, it may be made so that the output power of oscillator flowing out from the output waveguide of oscillator may be used without the cavity resonator 31.

It will be understood from the above that the patent right relative to this invention extends to all the traveling-wave tube oscillator which will be described in the claims.

We claim:

1. A traveling-wave tube oscillator comprising a traveling-wave tube amplifier composed of a traveling-wave tube equipped with an input and an output waveguides, a directional coupler having first, second, and third arms, said first arm being connected to said output waveguide, said second arm in which an electromagnetic wave from said first arm passes being connected to said input waveguide, said third arm through which an electromagnetic wave from said first arm passes being capable of sending said electromagnetic wave to said second arm, a diode installed in said third arm so as to serve as an impedance against an electromagnetic wave propagated therethrough, means for detecting a portion of the output of said traveling wave tube amplifier, means responsive to said detected output for controlling the impedance of said diode so as to make said impedance approximate the characteristic impedance of said third arm.

2. The combination defined in claim 1 wherein said last mentioned means includes a transistor for amplifying said detected output so as easily to control the impedance of said diode.

References Cited in the file of this patent

UNITED STATES PATENTS

| | | |
|---|---|---|
| 2,795,698 | Cutler | June 11, 1957 |